No. 731,553. PATENTED JUNE 23, 1903.
C. A. DUNN.
MILK STRAINER.
APPLICATION FILED FEB. 3, 1902.

NO MODEL.

Witnesses:—
E. S. Baldwin.

Inventor:—
Charles Arthur Dunn
by his Attorney
Henrie H. Hayward

No. 731,553.

Patented June 23, 1903.

UNITED STATES PATENT OFFICE.

CHARLES ARTHUR DUNN, OF WANGANUI, NEW ZEALAND.

MILK-STRAINER.

SPECIFICATION forming part of Letters Patent No. 731,553, dated June 23, 1903.

Application filed February 3, 1902. Serial No. 92,492. (No model.)

*To all whom it may concern:*

Be it known that I, CHARLES ARTHUR DUNN, a subject of His Majesty the King of Great Britain and Ireland, residing at Wanganui, in the Colony of New Zealand, have invented a new and useful Improved Milk-Strainer, (for which I have made application for Letters Patent in New Zealand, No. 14,069, bearing date October 1, 1901,) of which the following is a specification.

This invention provides an improved milk-strainer wherein the fluid is caused to pass upwardly through the straining medium, the greater part of the impurities being thrown down into a vessel provided for their reception.

Figure 1:
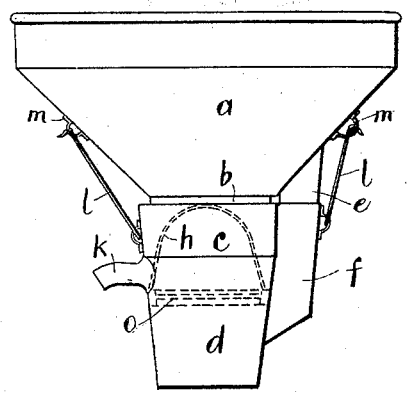
Figure 2:
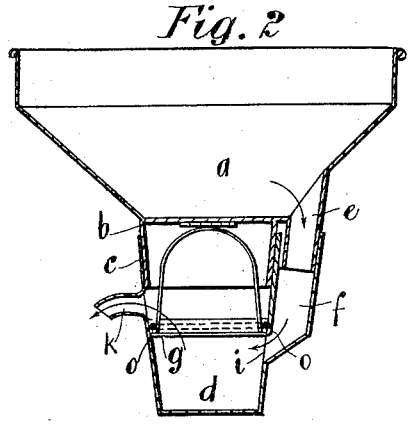
Figure 3:
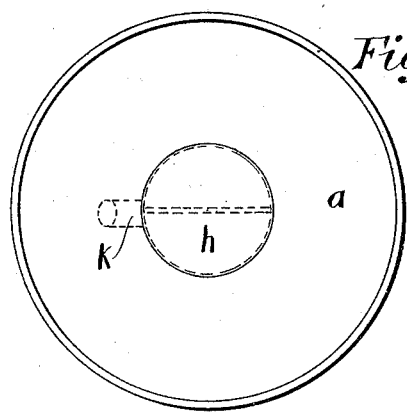

In the accompanying drawings, which form a part of this specification, Figure 1 is an elevation; Fig. 2, a vertical central section, and Fig. 3 a plan.

The receptacle $a$, into which the milk to be strained is poured, has a cylindrical extension $b$, fitting within the upper end $c$ of the well $d$. A tube $e$, leading from receptacle $a$, fits within the well-feeder $f$, which is attached to the side of well $d$.

Strainer $g$, which consists of a ring carrying wire-gauze, muslin, or other straining medium, fits closely against well $d$ and has a circumferential groove $n$ receiving a rubber ring $o$ to insure a fluid-tight joint. A handle $h$, which bears against the bottom of receptacle $a$, prevents the strainer from rising with the flow of milk. An opening $i$ permits milk to flow from the feeder $f$ into the well, and a pipe $k$ conducts milk after it has been strained to any ordinary containing vessel. The well and feeder are secured to the receptacle by wire hooks $l$, taking into loops $m$, so that the whole apparatus can be taken apart for cleaning purposes.

The lower part of the well $d$ is made to fit into the mouth of an ordinary milk-can, which serves merely as a support for the apparatus.

In operation the milk is poured into the receptacle and passes in the direction of the arrows, Fig. 2, solid impurities being extracted by the strainer and the bulk thereof thrown down into the well, so that the straining medium is comparatively free.

What I claim as my invention, and desire to secure by Letters Patent, is—

1. The combination for the purpose indicated of a receptacle for milk to be strained, a cylindrical extension closed at its upper end by the bottom of the receptacle, a well receiving said extension telescopically within its upper end, a strainer consisting of a foraminated partition within the well, a tube upon the receptacle connectible with a tube opening into the well beneath the straining-partition and a pipe upon the well above said partition for conducting away strained milk as specified.

2. A milk-strainer comprising in combination a funnel-shaped receptacle, into which milk to be strained is poured, a vessel forming a well beneath said receptacle, a cylindrical extension from the receptacle closed at its upper end by the bottom of the receptacle and adapted to fit into the open top of said well, a tube projecting downwardly from the receptacle, an upwardly-projecting tube upon the well adapted to receive the tube upon the receptacle, a foraminated strainer in the well above the inlet from said tube and a pipe upon the well above the strainer for carrying away strained milk as specified.

3. The combination in a milk-strainer, of a funnel-shaped receptacle, a vessel forming a well beneath said receptacle, a cylindrical extension from the receptacle closed at its upper end by the bottom of the receptacle, and adapted to fit into the open top of the well, a tube projecting downwardly from the receptacle, an upwardly-projecting tube upon the well adapted to receive the tube upon the receptacle, a ring fitting circumferentially the inside of the well and carrying material to form a foraminous partition therein, a wire handle upon the ring adapted to contact with the bottom of the receptacle when the ring is in position, and a pipe upon the well above said partition to carry away strained milk; as specified.

4. The combination in a milk-strainer, of a receptacle, for milk to be strained, a cylindrical extension closed at its upper end by the bottom of the receptacle, a well consisting of a vessel receiving said extension telescopically within its upper end, a straining-partition within the well, a tube upon the receptacle connectible with a tube leading into the well beneath the strainer, a pipe leading from the well above the strainer and wire hooks upon the well adapted to engage into loops upon the receptacle as specified.

In witness whereof I have hereunto set my hand in presence of two witnesses.

CHARLES ARTHUR DUNN.

Witnesses:
CECIL J. WRAY,
L. BRANDON.